US009154497B1

(12) United States Patent
Balzam et al.

(10) Patent No.: US 9,154,497 B1
(45) Date of Patent: Oct. 6, 2015

(54) MAINTAINING ACCOUNTABILITY OF A SHARED PASSWORD AMONG MULTIPLE USERS (71) Applicant: CA, Inc., Islandia, NY (US)

(72) Inventors: Guy Balzam, Raanana (IL); Itzhak Fadida, Haifa (IL); Amir Jerbi, Givatayim (IL); Aviva Weinberg, Netanya (IL)

(73) Assignee: CA, Inc., New York, NY (US)

( * ) Notice: Subject to any disclaimer, the term of this patent is extended or adjusted under 35 U.S.C. 154(b) by 0 days.

(21) Appl. No.: 14/223,775

(22) Filed: Mar. 24, 2014

(51) Int. Cl.
*H04L 29/06* (2006.01)

(52) U.S. Cl.
CPC .................... *H04L 63/083* (2013.01)

(58) Field of Classification Search
CPC ...... H04L 63/104; H04L 63/083; G06F 21/31
USPC ........................................... 726/5
See application file for complete search history.

(56) References Cited

U.S. PATENT DOCUMENTS

2004/0059688 A1* 3/2004 Dominguez et al. ............ 705/75
2011/0289597 A1* 11/2011 Hinds et al. ...................... 726/28

OTHER PUBLICATIONS

Googe Product Forums—Gmail. "Unusual Usage—Account Temporarily Locked Down? How do I stop the 'unusual usage' and regain access to my e-mail?!" 1 page. Viewed online Mar. 11, 2104, at https://productforums.google.com/forum/#!topic/gmail/ZWCL368P5Qo%5B1-25-false%5D.
"10 Ways to Tighten Up Your Gmail Security." Online blog. Viewed Mar. 11, 2014, at http://hongkiat.com/blog/gmail-security-tips/.

* cited by examiner

*Primary Examiner* — Jason K Gee
(74) *Attorney, Agent, or Firm* — Coats & Bennett, PLLC (57) ABSTRACT

A network server verifies a requesting user's permission to use a password to access a shared account hosted on a network server. The requesting user may be the person to whom the password was assigned, or in some cases, permission to use the password may have been granted to the requesting user by the person to whom the password is assigned. Provided the requesting user has permission to use the password, the system authenticates the requesting user for access to the shared account, and maintains accountability of the password.

15 Claims, 4 Drawing Sheets

MAINTAINING ACCOUNTABILITY OF A SHARED PASSWORD AMONG MULTIPLE USERS

BACKGROUND

The present disclosure relates to assigning a password for a shared account to a given user, and more particularly, to computer systems for maintaining control and accountability of a password after it is shared among multiple users.

A password management system comprises a system of hardware and software that helps users access shared accounts on network servers. Generally, such systems store a plurality of passwords that are associated with the shared accounts. When a user wishes to access a given shared account, the user requests a password for the shared account from the password management system. In response, and provided the user has the appropriate privileges to access the shared account, the password management system "checks-out" a selected password for the shared account and assigns it to the user. The newly assigned password remains associated only with the user such that no other user may be assigned that same password until the user checks the password back into the password management system.

Conventionally, password management systems maintain accountability of the password for the user that checked the password out of the system. That is, conventional systems are configured to track the use of the assigned password as if the user has control of the password. However, the user may—appropriately or inappropriately—transfer control of the assigned password to another user. And once a password is transferred or made known to another user, conventional password management systems are unable to maintain accountability for that password.

BRIEF SUMMARY

The present disclosure provides a computer-implemented method and corresponding system for authenticating multiple users for access to a shared account on a network server, and for maintaining accountability of the password when a user of the password transfers control of the password to, or otherwise shares the password with, another unknown user.

In one embodiment, the present disclosure provides a method comprising for verifying whether a user who is requesting access to a shared account has permission to use a password required to gain access to the account. The requesting user may be the user to whom the password was assigned by a password management server, or another user who took control of the password, appropriately or inappropriately, assigned to the user.

In this embodiment, the method comprises receiving, at a server in a communications network, an access request to a shared account from a requesting user. The access request comprises the password assigned to a first user. The method further comprises validating, based on a detected change in risk that the access request is received from an authorized user, whether the requesting user has permission to use the password. To perform the validation, the server sends a challenge message to a device associated with the requesting user, and in response, receives verification from a password management server indicating whether the requesting user has permission to use the password assigned to the first user. If the requesting user has permission to use the password, the server authenticates the requesting user for access to the shared account.

In one embodiment, the present disclosure provides a network server, such as an application server, for example, comprising a communications interface circuit and a processor circuit. The communications interface circuit is configured to receive an access request to a shared account from a requesting user, wherein the access request comprises a password assigned to a first user. Responsive to receiving the access request, the processor circuit is configured to validate, based on a detected change in risk that the access request is received from an authorized user, whether the requesting user has permission to use the password. In one embodiment, for example, the server sends a challenge message to a device associated with the requesting user. In response, the server receives verification from a password management server that assigned the password indicating whether the requesting user has permission to use the password. Provided the requesting user has permission from the first user to use the password, the server will authenticate the requesting user for access to the shared account.

In one embodiment, the present disclosure provides a computer program product comprising a computer-readable medium. The computer-readable medium is configured to store an agent module that, when executed by a processor circuit on a network server, configures the processor circuit to receive an access request to a shared account from a requesting user in which the access request comprises a password assigned to a first user. Upon receipt, the agent module further configures the processor circuit to, based on a detected change in risk that the access request is received from an authorized user, validate, with a password management server, whether the requesting user has permission to use the password. If the requesting user has such permission, the agent module is further configured to control the processor circuit to authenticate the requesting user for access to the shared account.

In one embodiment, the present disclosure provides a password verification system comprising a password management server and an application server. The password management server is configured to assign a password for a shared account to a first user responsive to receiving a request for the password from the first user. The application server comprises an agent module configured to receive an access request to the shared account from a requesting user, wherein the access request comprises the password assigned to a first user, and validate whether the requesting user has permission to use the password based on a detected change in risk in whether the access request was received from an authorized user. To perform the validation, the agent module is configured to send a challenge message to a device associated with the requesting user, and in response, receive verification from the password management server indicating whether the requesting user has permission to use the password. The agent module is then configured to authenticate the requesting user for access to the shared account if the requesting user has permission to use the password.

Of course, those skilled in the art will appreciate that the present embodiments are not limited to the above contexts or examples, and will recognize additional features and advantages upon reading the following detailed description and upon viewing the accompanying drawings.

BRIEF DESCRIPTION OF THE DRAWINGS

Aspects of the present disclosure are illustrated by way of example and are not limited by the accompanying figures with like references indicating like elements.

DETAILED DESCRIPTION

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely as hardware, entirely as software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald. C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Accordingly, the present disclosure provides a system, a method, an apparatus, and a corresponding computer program product for verifying whether users have permission to use a password to access a shared account on a network server, and if so, authenticating those users for access to the shared account. Such verification may be triggered, for example, by a detected change in risk that that the user who is attempting to use the password to access the shared account is authorized to access the shared account. The present disclosure also provides for maintaining accountability of the password after the user who initially checked-out the password from a centralized password management system transfers control of the password to, or otherwise shares the password with another user. The present disclosure utilizes functions that are already available with a given user's computing device (e.g., a PC or mobile phone), and thus, verification of any given user to use a password that has been shared or transferred is greatly simplified.

Figure 1:
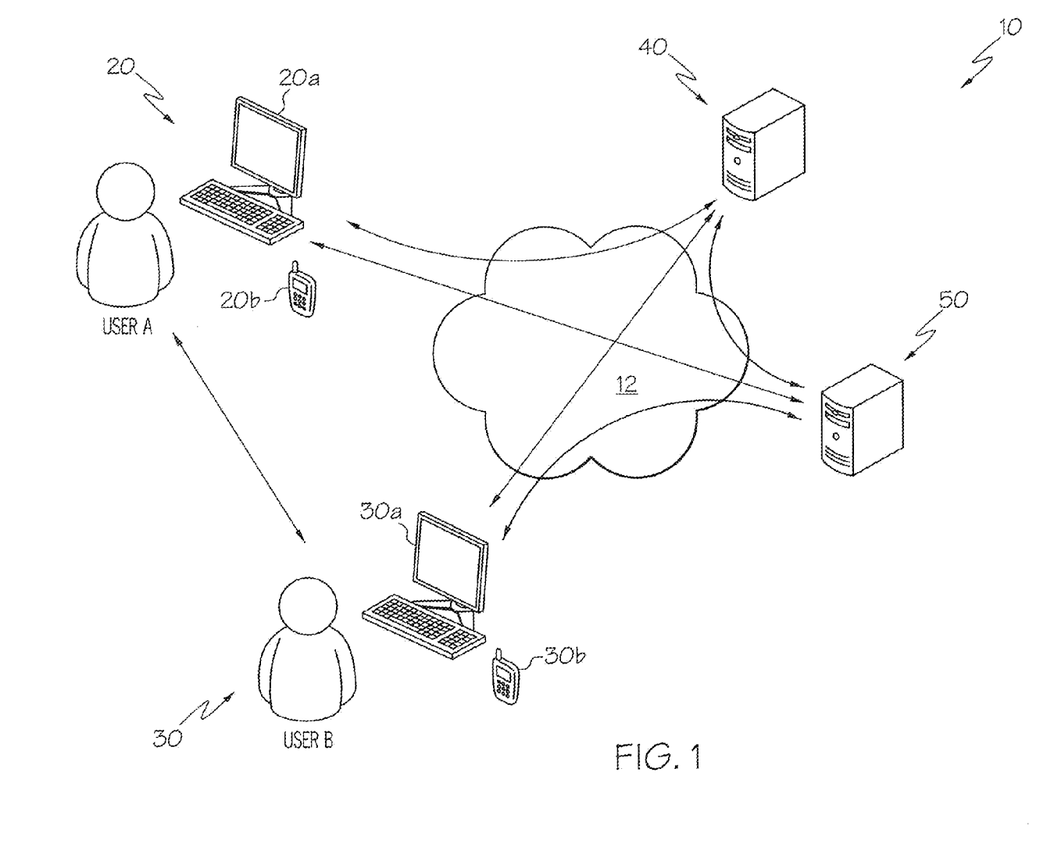
FIG. 1 is a block diagram illustrating a system and computer network configured to one embodiment of the present disclosure.

Turning now to the drawings, FIG. 1 is a block diagram illustrating some of the physical and functional components of a system 10 configured to authenticate multiple users for access to a shared account on a network server, and for maintaining the accountability of the password used by the multiple users according to one embodiment of the present disclosure.

As seen in FIG. 1, system 10 comprises an Internet Protocol (IP) communications network 12 that communicatively connects the devices 20, 30 of multiple users (referenced herein as "User A" and "User B," for clarity) with a Password Management System (PMS) 40 and an application server (AS) 50. Those of ordinary skill in the art should readily appreciate that such systems 10 may generally comprise other components; however, they are not shown here for clarity.

The IP network 12 comprises, as is known in the art, a packet-switched network that utilizes the well-known Transmission Control Protocol (TCP) and Internet Protocol (IP) to communicate data packets between devices that are connected to the network 12. In this embodiment, devices 20a, 20b (collectively, 20) that are associated with User A communicate data packets over network 12 with the PMS 40 to request and receive passwords, and with AS 50 to access a shared account using those passwords. Similarly, the devices 30a, 30b (collectively, 30) associated with User B communicate data packets over network 12 with AS 50 to access the shared account. In some embodiments, described in more detail below, devices 30 also communicate with the PMS 40 via IP network 12.

Those of ordinary skill in the art should appreciate that devices 20 and/or 30 may comprise any type of communication device; however, for illustrative purposes only, the devices 20, 30 are illustrated in the figures as being a desktop computer (20a, 30a) and a mobile phone (20b, 30b). Other possible devices include, but are not limited to, laptop computing devices, tablet computing devices, and the like.

FIG. 1 illustrates User A and User B as being able to communicate with each other outside of the realm of IP network 12. Such communication may be written or oral, for example, but in the context of the present disclosure, comprises a communication in which User A transfers, or makes known to User B, a password that was initially assigned to User A from the PMS 40. Conventionally, systems relying on the password would not be able to track such a transfer, and therefore, lose accountability of the password. That is, conventional systems would not be able to determine which user employed the password to access the account—the user who initially checked-out the password, or another user that gained control of the password either appropriately or via malicious means.

However, in one embodiment of the disclosure, devices 20, 30 comprise integrated cameras and/or other user input/output interfaces that allow their respective users to capture images and otherwise interact with those devices. As described in more detail below, the system 10 is configured to leverage these functions of devices 20, 30 to maintain the accountability of the password even as that password is dynamically shared with other users that may be unknown to the system 10.

The PMS 40 comprises one or more servers connected to the network 12. Each of these PMS 40 servers is configured to store multiple passwords associated with one or more shared accounts hosted on other servers, such as AS 50. More particularly, the PMS 40 facilitates an organization's ability to secure, manage, and track the use of the passwords and other privileged credentials that may be used for operating systems, databases, applications, hypervisors, and network devices, for example. Further, PMS 40 maintains control and accountability of each password. As described in more detail later, the PMS 40 checks out a password out to a user upon receiving a request for the password from the user, but only if the requesting user has the privileges to access the shared account. Once a user is finished with a given password, the PMS 40 allows the user to check the password back into the PMS 40. Note that once a password has been assigned to a given user, that same password cannot be assigned to another user by PMS 40 until the initial user checks the password back-in.

As previously stated, a user who initially receives a password from the PMS 40 may transfer or share that password with one or more other users. Such a transfer may be appropriate or inappropriate. Additionally, another user may obtain control of the password assigned to the user via malicious means. Therefore, in one embodiment, the PMS 40 is configured to receive information from the user who initially received the password from PMS 40 about other users who have the user's permission to use the password. The information may comprise any information or data needed to positively identify and verify the other users to the PMS 40, and includes, but is not limited to, images of the other users, identities, and personal identification numbers (PINs) or other codes known to the other users. As described in more detail below, the PMS 40 will use this information to first verify to AS 50 whether a user who is requesting access to a shared account on AS 50 has permission to use the password from the person who initially was assigned the password.

The AS 50 is an application server connected to network 12 that may execute any desired set of one or more applications for providing any number of desired services to a user. In this embodiment, AS 50 hosts a shared account that may be accessed only by the users that have the proper credentials. As is described in more detail below, such credentials include, but are not limited to, user IDs and passwords assigned to the user by PMS 40.

In this embodiment, AS 50 is also configured to detect a risk associated with a person who is attempting to access the shared account using a password, and in response, to communicate with PMS 40 via network 12 regarding that risk. Such communications allow the AS 50 to verify whether a user (e.g., User B) who is requesting access to the shared account on AS 50 has permission to use the password from the user who was assigned the password (e.g., User A). This helps the requesting user (e.g., User B) to access the shared account on AS 50, even though the password required for accessing the shared account was initially assigned to a completely different user.

Figure 2:
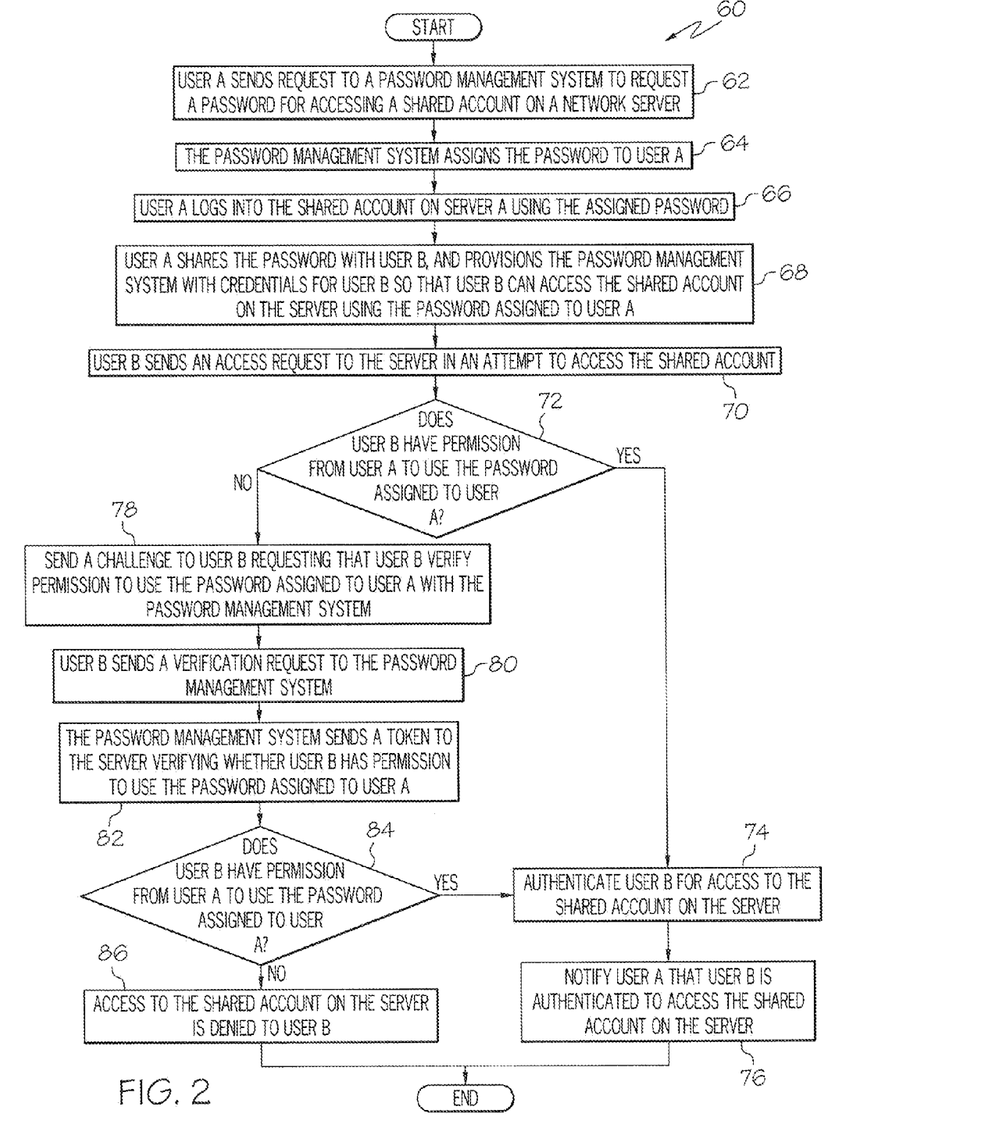
FIG. 2 is a flow diagram illustrating a method for maintaining accountability of a password transferred between users according to one embodiment of the present disclosure.

FIG. 2 is a flow diagram illustrating a method 60 for authenticating multiple users for access to the shared account on AS 50, and for maintaining the accountability of the password used by the users according to one embodiment of the present disclosure. Method 60 begins with User A sending a request to PMS 40 requesting a password (box 62). The password, when assigned, will allow the user to gain access to a particular shared account hosted on AS 50, and thus, is tied to the privileges associated with that account. Upon receiving the request from the user, PMS 40 may validate the user, as is known in the art, to ensure the user is authorized to be assigned the password. However, once User A is authorized, PMS 40 assigns the password to User A and logs the transaction to associate User A with the password (box 64).

Using the assigned password, as well as some other information such as a username, for example, User A can log into the shared account on AS 50 (box 66). Once logged in, User A can perform any task or function with respect to the shared account for which the user is entitled. Typically, once User A is finished, User A would simply log out and check the password back into the PMS 40. However, in accordance with this embodiment. User A transfers or shares the assigned password with User B. Additionally, User A provisions PMS 40 with information about User B to indicate that User B has the permission of User A to access the shared account using the password initially assigned to User A (box 68). As stated above, such information includes, but is not limited to, images of User B or other information known to User B.

Subsequently, User B sends an access request to the AS 50 requesting access to the shared account (box 70). In one embodiment, for example, the access request comprises a message that includes predetermined information, such as a username for User B and the password assigned to User A. Upon receipt of the access request, AS 50 is programmed to determine whether the risk in allowing access to the shared account using the password has changed. Particularly, AS 50 is configured to detect whether the user attempting to access AS 50 with the password may not be who they say they are based on any number of known triggers. Such triggers include, but are not limited to, detecting that the attempted access is from a flagged or unknown geographical location, that the location from which access is attempted has changed from previous or known access location, the expiration of a timeout, the determination that the user ID of the requesting user is unknown or different from the user ID of the user that is assigned the password, a determination that the access request is originating from an unknown or different IP address, and the like.

In this embodiment, AS 50 determines that User B is unknown to AS 50, and that User B is utilizing a password previously utilized by User A to access the same shared account. As such, responsive to the change in risk, AS 50 will first determine whether User B is who they say that they are and has permission from User A to use the password (box 72) before authenticating User B for access to the shared account.

As stated previously, the data required for AS 50 to determine whether User B has permission from User A (e.g., an image of User B, or a PIN known to User B) was provisioned by User A and stored, for example, in a memory circuit associated with the AS 50. The PMS 40 could, in one embodiment, be configured to periodically, or on demand, "push" the data to AS 50. In such embodiments, the AS 50 would simply look to this data in its own memory to verify whether User B had permission from User A to utilize the password. For example, AS 50 could compare the identity provided by User B in the access request to the identity of User B received from PMS 40. If the two match, User B would be verified. Other methods of verification are also possible, although they are not mentioned explicitly herein.

Upon determining that User A had granted User B permission to employ the password, AS 50 authenticates User B for access to the shared account (box 74). Once authenticated, the AS 50 may be configured to generate and send a notification to User A indicating that User B has successfully logged into the shared account using the password initially assigned to User A (box 76).

In cases where the data required by AS 50 to determine whether User B has the proper permission from User A is not accessible to AS 50, the AS 50 will not be able to determine whether User B has the proper permission from User A (box 72). In these cases, AS 50 will not authenticate User B, but instead, will try to validate whether User B has the proper permission from User A based on information stored at the PMS 40. Particularly, in one embodiment, the AS 50 is configured to generate and send a challenge to one or both of the devices 30 associated with User B requesting that the user verify permission to use the password with the PMS 40 that initially assigned the password to User A (box 78). Such verification may be accomplished using any known method, but in one embodiment, a device 30a or 30b of User B generates and sends a verification request message to the PMS 40 (box 80) via network 12.

The verification request message may comprise any information needed or desired, but in one embodiment, the verification message includes a username that uniquely identifies User B, the password assigned to User A, and an image of User B captured by a camera integrated into device 30. By way of example only, the integrated camera of device 30a or 30b may have been controlled to capture the image based on a command or other signal included with the challenge message received from the AS 50. Alternatively, User B may be prompted to capture the image as part of the verification request generation, or to select an image stored in a memory circuit of device 30a or 30b.

Regardless of how the image is captured, however, PMS 40, upon receipt of the verification request message, uses the information to determine whether User B has the appropriate permission from User A to use the password. In one embodiment, for example, PMS 40 analyzes and compares the data and information (e.g., the image of User B) received with the verification request message to data and information previously provisioned by User A. Such analysis may comprise, for example, an image analysis to compare the image received with the verification request message to the image stored at PMS 40. PMS 40 then returns a token to AS 50 indicating whether User B has permission from User A to use the password (box 82). Particularly, if User B is determined to have the proper permission (e.g., an analysis reveals that the received image matches a stored image to within a predetermined threshold), PMS 40 sends a token to the AS 50 indicating that User A has granted the appropriate permission to User B to use the password initially assigned to User A. If not, the token indicates that User B does not have the requisite permission from User A.

Upon receiving the token, AS 50 determines whether User B has permission from User A to use the password based on the token (box 84). If the token indicates that User B does not have the appropriate permission from User A, authentication for User B is denied and the method 60 ends (box 86). Otherwise, AS 50 authenticates User B for access to the shared account (box 74). AS 50 then notifies User A that User B has successfully logged into the shared account using the password initially assigned to User A (box 76).

In some instances, the AS 50 will not be able to verify that User B has the proper permission from User A to use the password to access the shared account. In these cases, the AS 50 may consider that the password initially assigned to User A has been stolen or otherwise compromised. Although access to the server in such situations is denied, User A may not be aware of the situation, and as such, try to access the shared account using the password. In these cases, the next time User A tries to access the shared account using the password, User A will also be asked to verify his/her identity with PMS 40 to ensure that User A has permission to use the password.

Figure 3:
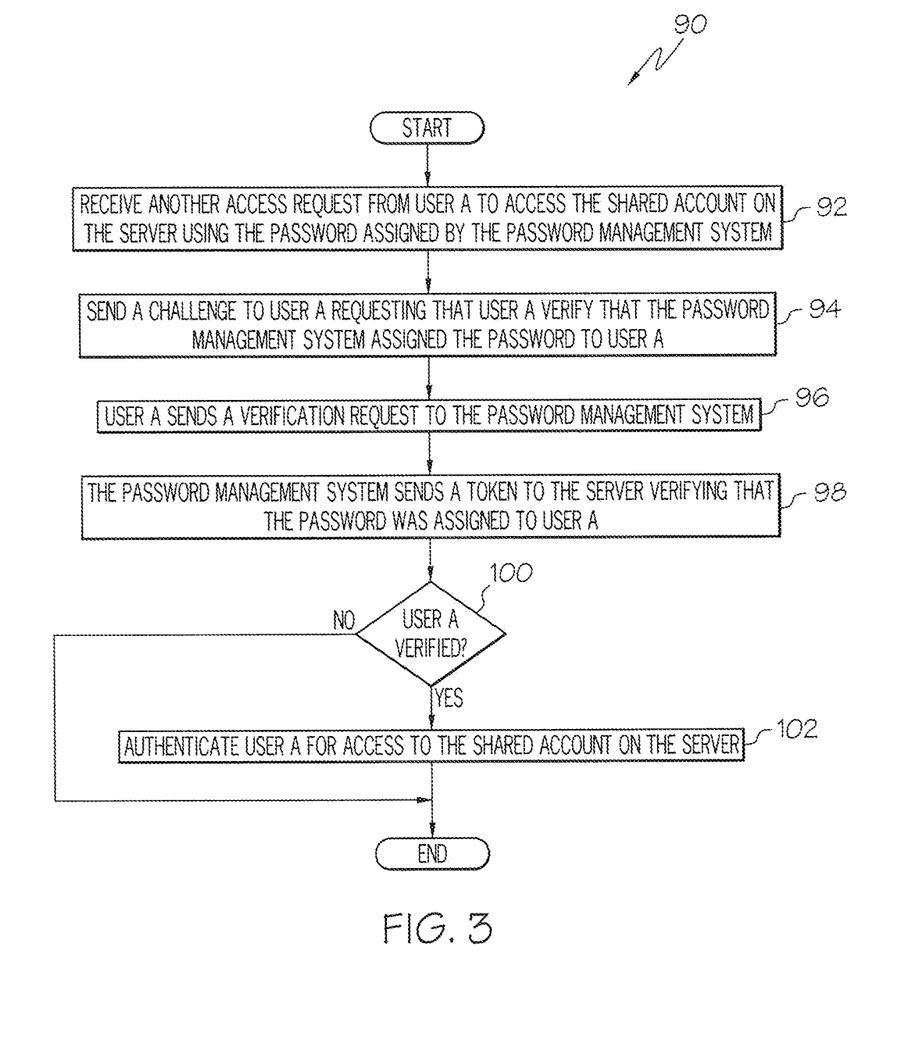
FIG. 3 is a flow diagram illustrating a method for maintaining accountability of a password transferred between users according to another embodiment of the present disclosure.

FIG. 3 is a flow diagram illustrating a method 90 in which User A attempts to access the shared account on AS 50 using the password after User B has been denied access using the password. Method 90 begins when AS 50 receives a subsequent access request from User A to access the shared account using the password (box 92). In response, AS 50 detects a change in risk (e.g., that a previous attempt at accessing the shared account using the password was denied) and will send a challenge message to a device 20*a* and/or 20*b* associated with User A. As previously described, the challenge message comprises a request for User A to verify with the PMS 40 that User A was assigned the password being used to access the shared account, and that User A has permission to use the password (box 94). Upon receiving the challenge message, the device 20*a* (or device 20*b*) associated with User A sends a verification request message to the PMS 40 requesting that the PMS 40 verify that the password was indeed assigned to User A from PMS 40 (box 96). The verification request message may comprise the same or similar information as the message sent by User B, as described previously. After performing an analysis on the information provided by User A in the verification request message, which may be the same or similar to the analysis provided above for verifying User B (e.g., an image analysis), PMS 40 returns a token to the AS 50. As above, the token indicates whether User A is or is not verified as having been assigned the password by PMS 40, and thus, having permission to use the password. In this case, the token sent by PMS 40 indicates that the PMS 40 did assign the password to User A (box 98). Upon receipt, the AS 50 verifies that User A has the requisite permission based on the token (box 100), and if verified, authenticates User A for access to the shared account on AS 50 (box 102). Otherwise, if PMS 40 does not verify that User A has permission to use the password, the method 90 ends without User A being authenticated.

Figure 4:
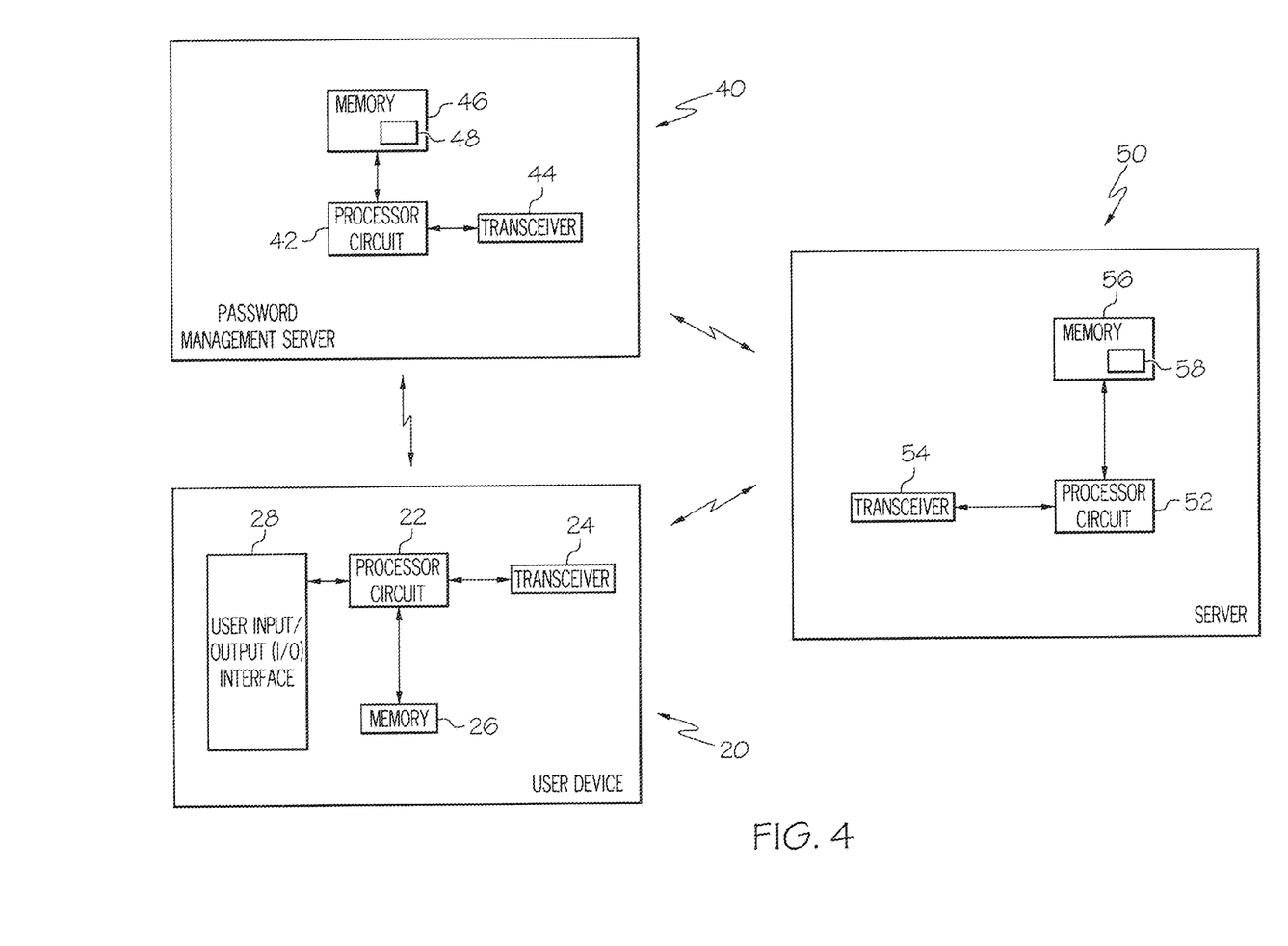
FIG. 4 is a block diagram illustrating some components of the system for maintaining accountability of a password transferred between users according to one embodiment.

FIG. 4 is a block diagram illustrating some of the components that comprise the AS 50, PMS 40, and user device 20 according to one embodiment. As seen in FIG. 4, AS 50 comprises a processor circuit 52, a transceiver 54, a memory circuit 56, and an agent module 58. As readily understood by those of ordinary skill in the art, other components not explicitly shown in the figures may also be present.

The processing circuit 52 may be implemented by one or more microprocessors, hardware, firmware, or a combination thereof, and generally controls the operation and functions of AS 50 according to the appropriate standards. Such operations and functions include, but are not limited to, communicating with PMS 40 and the user devices 20 (and/or 30) to verify, based on a detected risk or change in risk, whether one or both of User A and User B has permission to use a password initially assigned to User A, and authenticating one or both of User A and User B for access to a shared account on AS 50 based at least partially on that permission, as previously described. In this regard, the processing circuit 52 may be configured to the implement logic and instructions of agent module 58 stored in memory circuit 56 to perform the method according to the embodiments as previously described.

The transceiver 54 comprises a transceiver or other communications interface circuit that facilitates communications with the PMS 40 and/or user devices 20, 30 via IP network 12. The transceiver 54 may utilize any protocol or protocols known in the art to communicate the previously described messages, but in one embodiment, transceiver 54 communicates to PMS 40 and user device 20 via an ETHERNET interface utilizing a TCP/IP protocols.

The memory 56 may comprise any non-transitory, solid state memory or computer readable media known in the art. Suitable examples of such media include, but are not limited to, ROM, DRAM, Flash, or a device capable of reading computer-readable media, such as optical or magnetic media. The memory 56 stores programs and instructions such as agent module 58 that control the processing circuit 52 of AS 50 to communicate with PMS 40 and user devices 20 (and/or 30) to verify whether one or both of User A and User B has permission to use a password initially assigned to User A, and to authenticate User A and/or User B for access to a shared account on AS 50 based at least partially on that permission, as previously described.

The PMS 40 comprises, as stated above, one or more servers configured to store passwords associated with one or more shared accounts hosted on AS 50. In operation, the PMS 40 secures, manages, assigns, and monitors the use of the passwords by users, as well as maintains control and accountability of each password. To accomplish this, the PMS 40 comprises a processing circuit 42, a transceiver 44, and a memory 46.

The processing circuit 42 may be implemented by one or more microprocessors, hardware, firmware, or a combination thereof, and generally controls the operation and functions of PMS 40 according to the appropriate standards. Such operations and functions include, but are not limited to, communicating with AS 50 and the user devices 20 (and/or 30) to verify whether one or both of User A and User B has permission to use a password initially assigned to User A, as previously described. As such, the processing circuit 42 may be configured to the implement logic and instructions 48 stored in memory circuit 46 to perform these functions as previously described.

Particularly, in accordance with the logic and instructions 48, the processing circuit 42, upon receiving a request from a user device 20 (or user device 30), checks out a password out to a user. However, the processing circuit 42 is configured to ensure that the requesting user is assigned a password only if that user has the privileges associated with the password. Further, in one embodiment, processing circuit 42 is configured to ensure that any given password is checked out to only one user at a time. Once a user is finished with the password, the processing circuit 42 checks the password back into the PMS 40.

The transceiver 44 is similar to the transceiver 54 in that transceiver 44 comprises a communications interface circuit that enables the PMS 40 to communicate with one or both of the AS 50 and/or user devices 20, 30 via IP network 12. The transceiver 44 may utilize any protocol or protocols known in the art to communicate the previously described messages, but in one embodiment, communicates to AS 50 and user device 20 via an ETHERNET interface utilizing a TCP/IP protocols.

The memory 46 may comprise any non-transitory, solid state memory or computer readable media known in the art. Suitable examples of such media include, but are not limited to, ROM, DRAM, Flash, or a device capable of reading computer-readable media, such as optical or magnetic media. The memory 46 stores logic and instructions 48 that, when executed by the processing circuit 42, control the PMS 40 to communicate with AS 50 and user devices 20 (and/or 30) to verify whether one or both of User A and User B has permission to use a password initially assigned to User A, as previously described.

User device 20 may comprise, as seen in FIG. 1, a PC 20*a* or mobile phone 20*b*, or some other device capable of communicating with PMS 40 and/or AS 50 via IP network 12. To accomplish its functions, user device 20 comprises, inter alia, a processor circuit 22, a transceiver 24, a memory circuit 26, and a user input/output (I/O) interface 28. As those of ordinary skill in the art will readily appreciate, user devices 30*a*, 30*b* comprise components similar to those seen for user device 20. Therefore, the depiction of user device 20 in FIG. 4 is for illustrative purposes and ease of discussion only.

The processing circuit 22 may be implemented by one or more microprocessors, hardware, firmware, or a combination thereof, and generally controls the operation and functions of user device 20 according to the appropriate standards. Such operations and functions include, but are not limited to, communicating with AS 50 and with PMS 40 to request and obtain a password to a shared account on AS 50, and to verify the user's permission to use that password, as previously described. Particularly, the processing circuit 22 may be configured to the implement logic and instructions stored in memory circuit 26 to perform these functions as previously described.

The transceiver 24 comprises any communication interface circuit known in the art that enables the user device 20 to communicate data via one or more networks. For example, the interface 28 may communicatively connect the user device 20 to one or both of the PMS 40 and the AS 50 via network 12. Thus, in one embodiment, interface 28 comprises an ETHERNET interface that allows the device 20 to communicate via network 12. In another embodiment, interface 28 comprises a wireless interface configured to connect to network 12 via one or more wireless access networks (not shown). Of course, interface 28 may comprise an interface that allows the device 20 to communicate using multiple protocols.

The memory 26 may comprise any non-transitory, solid state memory or computer readable media known in the art. Suitable examples of such media include, but are not limited to, ROM, DRAM, Flash, or a device capable of reading computer-readable media, such as optical or magnetic media. The memory 26 stores logic and instructions (not shown) that, when executed by the processing circuit 22, control the user device 20 to communicate with AS 50 and PMS 40 to verify the user's permission to use the password, as previously described.

The user input/output (I/O) interface 28 provides the components necessary for a user to interact with the user device 20. Such components include, but are not limited to, a display and a keyboard that allows a user to enter the data and information necessary for the user device 20 to contact and communicate information and data with the PMS 40 and the AS 50, as well as an integrated camera configured to capture images of the user responsive to the device 20 receiving a challenge message from AS 50.

The present embodiments may, of course, be carried out in other ways than those specifically set forth herein without departing from essential characteristics of the disclosure. For example, it should be noted that the flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, to blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising." when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

Thus, the foregoing description and the accompanying drawings represent non-limiting examples of the methods and apparatus taught herein. As such, the present invention is not limited by the foregoing description and accompanying drawings. Instead, the present invention is limited only by the following claims and their legal equivalents.

What is claimed is:

1. A method comprising:
   receiving, at a server in a communications network, an access request to a shared account from a requesting user, wherein the access request comprises a password assigned to a first user, and wherein the requesting user and the first user are different users;
   validating, based on a detected change in risk that the access request is received from an authorized user, whether the requesting user has permission to use the password, comprising:
   sending a challenge message from the server to a device associated with the requesting user; and
   receiving, responsive to sending the challenge message, verification from a password management server indicating whether the requesting user has permission from the first user to use the password assigned to the first user; and
   authenticating, at the server, the requesting user for access to the shared account if the requesting user has permission from the first user to use the password.

2. The method of claim 1 wherein verifying, at the server, whether the requesting user has permission from the first user to use the password comprises:
   receiving a token from the password management server verifying that the first user gave permission to the requesting user to use the password; and
   determining, responsive to receiving the token, that the requesting user has permission from the first user to use the password.

3. The method of claim 1 further comprising notifying the first user whether the requesting user has been authenticated to access the shared account using the password assigned to the first user.

4. The method of claim 1 wherein the challenge message comprises a request for the requesting user to send credentials to the password management server proving an identity of the requesting user.

5. A server comprising:
- a communications interface circuit configured to receive an access request to a shared account from a requesting user, wherein the access request comprises a password assigned to a first user, and wherein the requesting user and the first user are different users; and
- a processor circuit configured to:
  - validate, based on a detected change in risk that the access request is received from an authorized user, whether the requesting user has permission to use the password, comprising:
    - sending a challenge message to a device associated with the requesting user; and
    - receiving, responsive to sending the challenge message, verification from a password management server indicating whether the requesting user has permission from the first user to use the password assigned to the first user; and
  - authenticate the requesting user for access to the shared account if the requesting user has permission from the first user to use the password.

6. The server of claim 5 wherein the processor circuit is further configured to:
- receive a token from the password management server verifying that the first user gave permission to the requesting user to use the password; and
- determine that the requesting user has permission from the first user to use the password based on the token.

7. The server of claim 5 wherein the processor circuit is further configured to notify the first user whether the requesting user has been authenticated to access the shared account using the password assigned to the first user.

8. A computer program product comprising:
- a computer-readable storage medium configured to store an agent module that, when executed by a processor circuit on a network server, configures the processor circuit to:
  - receive an access request to a shared account from a requesting user, wherein the access request comprises a password to the shared account assigned to a first user who is different from the requesting user;
  - based on a detected change in risk that the access request is received from an authorized user, validate, with a password management server, whether the requesting user has permission from the first user to use the password; and
  - authenticate the requesting user for access to the shared account if the requesting user has permission from the first user to use the password.

9. The computer program product of claim 8 wherein the agent module further configures the processor circuit to:
- send a challenge message to a device associated with the requesting user, wherein the challenge message comprises a command for the device to send a password verification request to the password verification server; and
- receive, from the password management server, a password verification response indicating whether the requesting user has permission from the first user to use the password.

10. The computer program product of claim 9 wherein the agent module further configures the processor circuit to:
- receive a token from the password management server verifying that the first user gave permission to the requesting user to use the password; and
- determine that the requesting user has permission from the first user to use the password based on the token.

11. The computer program product of claim 9 wherein the agent module further configures the processor circuit to notify the first user whether the requesting user has been authenticated to access the shared account using the password assigned to the first user.

12. A password verification system comprising:
- a password management server configured to assign a password for a shared account to a first user responsive to receiving a request from the first user; and
- an application server comprising an agent module that, when executed by a processing circuit at the application server, configures the application server to:
  - receive an access request to the shared account from a requesting user, wherein the access request comprises the password assigned to a first user, and wherein the requesting user and the first user are different users;
  - validate, based on a detected change in risk that the access request is received from an authorized user, whether the requesting user has permission from the first user to use the password, comprising:
    - sending a challenge message to a device associated with the requesting user; and
    - receiving, responsive to sending the challenge message, verification from the password management server indicating whether the requesting user has permission from the first user to use the password; and
  - authenticate the requesting user for access to the shared account if the requesting user has permission from the first user to use the password.

13. The password verification system of claim 12 wherein the password management server is further configured to:
- receive a verification request message from the device associated with the requesting user responsive to the challenge message, wherein the verification request message comprises credentials indicating the identity of the requesting user;
- verify the identity of the requesting user based on the credentials received in the verification request message;
- determine whether the requesting user has permission from the first user to use the password; and
- send the token indicating whether the requesting user has permission to use the password from the password management server to the agent module at the application server.

14. The password verification system of claim 12 wherein the agent module at the application server further configures the application server to notify the first user whether the requesting user has been authenticated to access the shared account using the password assigned to the first user.

15. The password verification system of claim 12 wherein the challenge message comprises a command for the device associated with the requesting user to send a request message to the password management server, the request message comprising credentials indicating the identity of the requesting user and a request for the password management server to verify that the requesting user has permission from the first user to use the password.

* * * * *